(12) United States Patent
McKinney

(10) Patent No.: US 7,186,330 B2
(45) Date of Patent: Mar. 6, 2007

(54) DISINFECTANT SYSTEM FOR USE WITH RESIDENTIAL AEROBIC WASTEWATER TREATMENT PLANTS

(75) Inventor: Jerry L. McKinney, Lumberton, TX (US)

(73) Assignee: Jerry L. McKinney 2002 Trust, Silsbee, TX (US)

( * ) Notice: Subject to any disclaimer, the term of this patent is extended or adjusted under 35 U.S.C. 154(b) by 373 days.

(21) Appl. No.: 10/866,349

(22) Filed: Jun. 11, 2004

(65) Prior Publication Data

US 2005/0274657 A1 Dec. 15, 2005

(51) Int. Cl.
*C02F 1/50* (2006.01)
*C02F 1/76* (2006.01)

(52) U.S. Cl. .............. 210/86; 210/121; 210/198.1; 210/143; 222/52

(58) Field of Classification Search .............. 210/86, 210/121, 198.1; 222/52, 143
See application file for complete search history.

(56) References Cited

U.S. PATENT DOCUMENTS

| | | | |
|---|---|---|---|
| 3,996,139 A | 12/1976 | Prince et al. | |
| 4,019,983 A | 4/1977 | Mandt | |
| 5,221,470 A * | 6/1993 | McKinney | 210/151 |
| 5,770,081 A * | 6/1998 | McKinney | 210/620 |
| 6,346,198 B1 * | 2/2002 | Watson et al. | 210/739 |
| 6,458,268 B1 * | 10/2002 | Grandprey et al. | 210/96.1 |
| 6,627,071 B1 | 9/2003 | Braden | |
| 2003/0155311 A1 | 8/2003 | Chaffin | |

* cited by examiner

*Primary Examiner*—Terry K. Cecil
(74) *Attorney, Agent, or Firm*—C. James Bushman Browning Bushman P.C.

(57) ABSTRACT

A system for introducing a liquid disinfectant into treated wastewater comprising a source of liquid disinfectant, a sensor to detect flow of treated wastewater from a wastewater treatment system, a pump to introduce the liquid disinfectant into the treated wastewater and a controller operatively connected to the sensor to activate the pump in response to increased flow of treated wastewater above a sensed, predetermined flow rate.

12 Claims, 5 Drawing Sheets

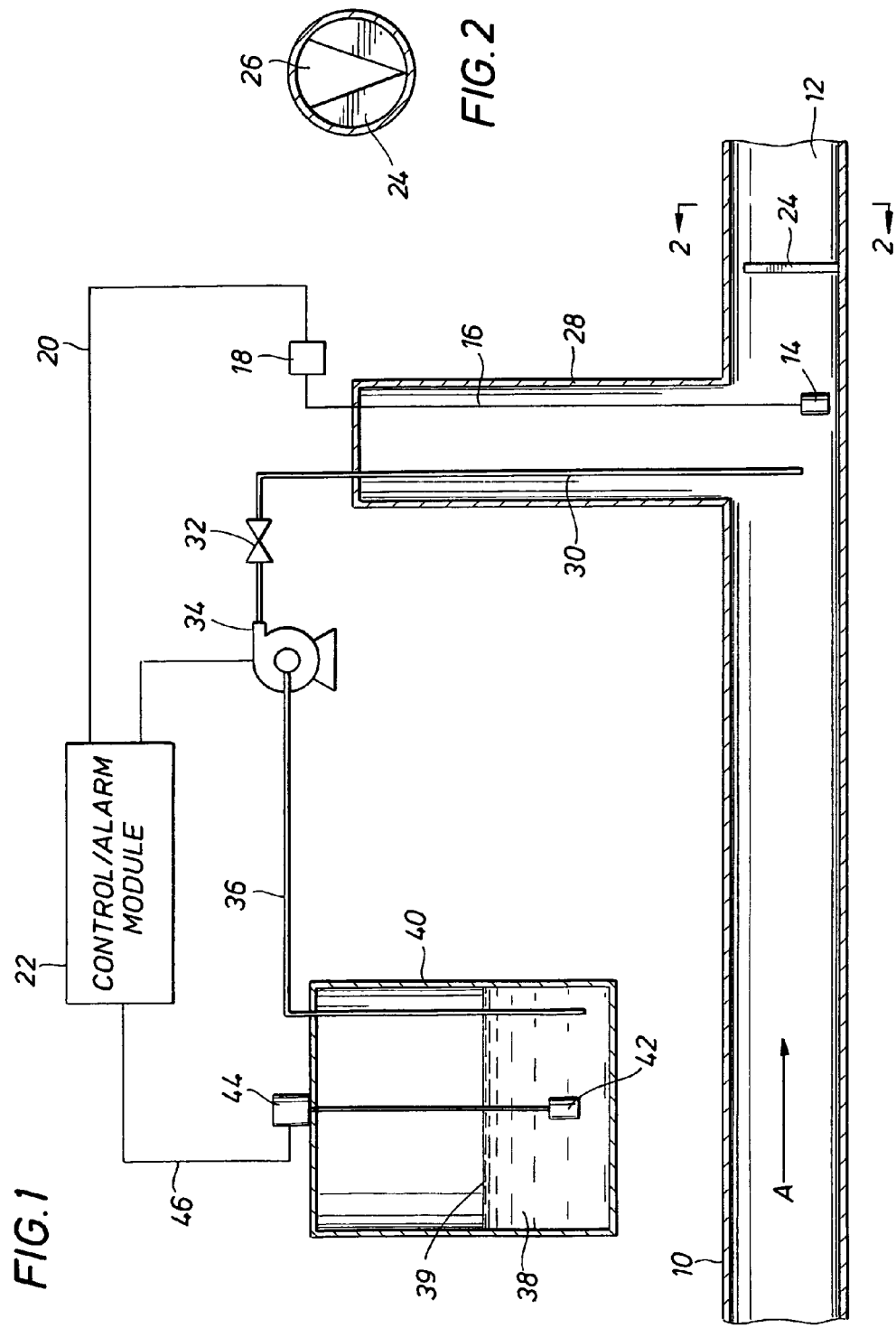

DISINFECTANT SYSTEM FOR USE WITH RESIDENTIAL AEROBIC WASTEWATER TREATMENT PLANTS

BACKGROUND OF THE INVENTION

1. Field of the Invention

The present invention relates to the treatment of wastewater from an aerobic wastewater treatment plant. More particularly, the present invention relates to a system for disinfecting wastewater from an aerobic wastewater treatment plant using a liquid disinfectant.

2. Description of the Prior Art

Aerobic wastewater treatment plants are commonly used in the United States in areas where there is a lack of municipal sewerage treatment and disposal. These generally small volume plants, e.g., flow rates of under 5,000 gallons per day, typically comprise an aerobic treatment chamber wherein the sewerage is initially subjected to bacterial action to break down the solids, a clarifier to allow residual solids to be removed from the aerobically digested sewerage to produce treated wastewater, and a discharge system which typically is in the form of a pump tank containing a discharge pump which can be used to discharge the treated water in the pump tank in a variety of ways, e.g., night spray systems, drip irrigation systems, discharge into a stream or the like.

Regardless of the method by which the water is finally discharged, most State and Federal regulations require that the water to be discharged be disinfected to eliminate or at least reduce the bacteria to an acceptable level. For this purpose, it has been common to use chlorinators, particularly chlorinators using tablets or other forms of solid, chlorine generating materials. It is also known to use liquid chlorinators wherein an amount of a liquid chlorine containing composition is injected into the clarified (treated) wastewater.

Typically liquid chlorinators have relied on the use of venturis or venturi-like pumps (venturi systems) to draw the liquid chlorine composition from a storage system into wastewater passing through the venturi system. An inherent problem with these venturi systems is that the wastewater passing there through is generally not totally free of solids. Since typically the nozzles of venturi systems have small diameter openings, there is a likelihood of plugging of the venturi with a concomitant disabling of the liquid chlorine composition infusion system. Examples of typical liquid chlorinators or liquid disinfectant systems employing the aspirating phenomena of venturi systems include U.S. Pat. Nos. 3,996,139; 4,019,983; 6,627,071 and U.S. Patent Application Publication 2003/0155311.

SUMMARY OF THE INVENTION

In a preferred aspect, the present invention provides a system for introducing a liquid disinfectant into treated wastewater comprising a source of liquid disinfectant; a sensor to detect flow of treated wastewater from a wastewater treatment system; a pump to introduce a liquid disinfectant into the treated wastewater; and a controller operatively connected to the sensor to activate the pump in response to increased flow of treated wastewater above a sensed, predetermined flow rate.

BRIEF DESCRIPTION OF THE DRAWINGS

FIG. 1 is a schematic diagram showing one embodiment of the liquid disinfectant system of the present invention wherein the liquid disinfectant is introduced into a conduit or the like from an aerobic wastewater treatment system.

FIG. 2 is a view taken along the lines 2—2 of FIG. 1.

FIG. 7 is a typical electrical wiring diagram for use with the disinfectant system of the present invention.

DESCRIPTION OF THE ILLUSTRATED EMBODIMENTS

Figure 3:
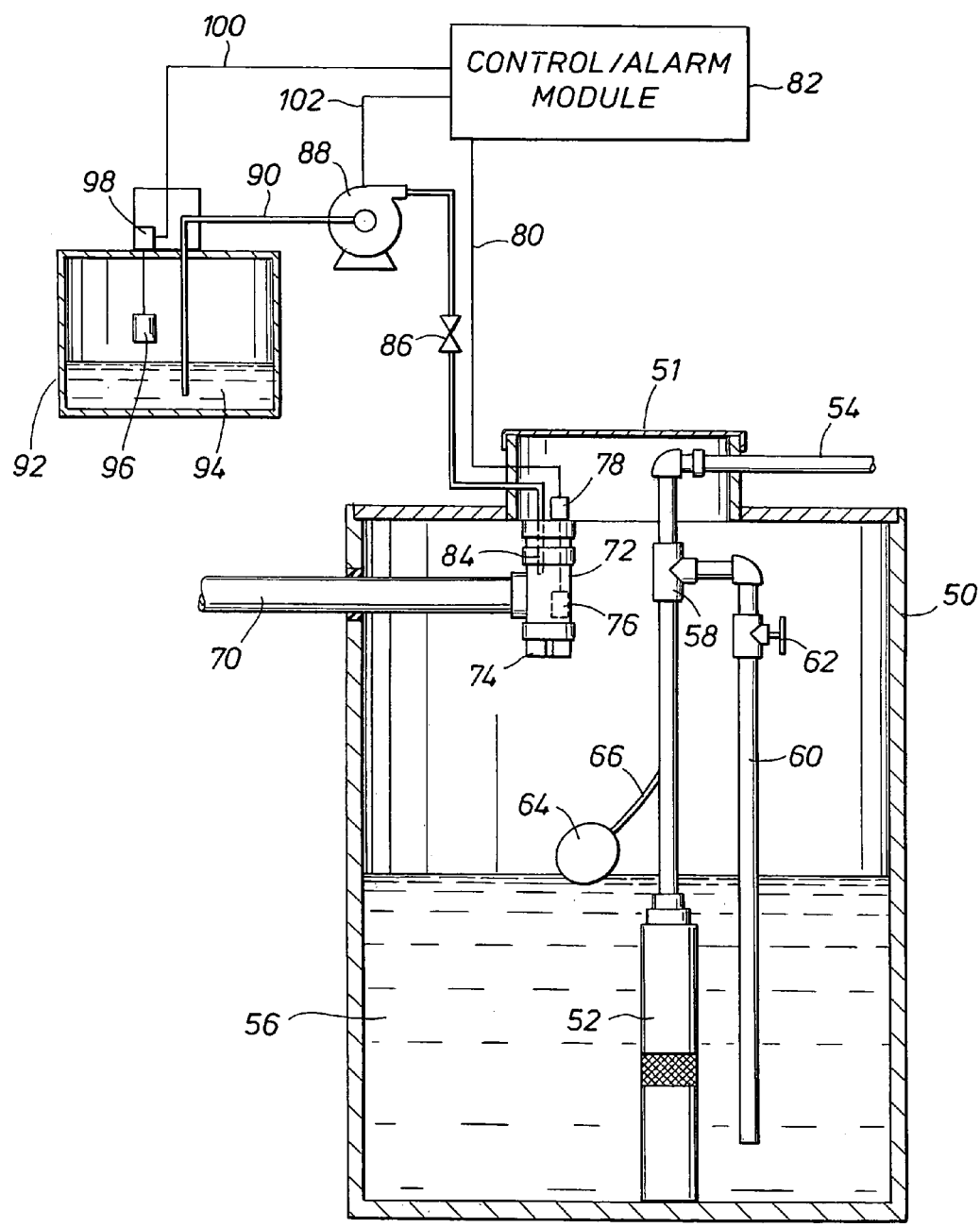
FIG. 3 is an elevational, schematic view of another embodiment of the present invention wherein the liquid disinfectant system is disposed in a pump tank from which treated and disinfected water is discharged.

The disinfection system of the present invention is directed to use with wastewater treatment plants which can be referred to as "residential aerobic treatment systems" (RATS) and is intended to encompass any small volume (flow rates of less than about 5,000 gallons per day, preferably flow rates of from 500 to 1,000 gallons per day) system whether residential or not wherein raw sewerage effluent is aerobically treated and disinfected before being discharged to a drain field, a spray system, or as an effluent into a stream or the like.

The disinfection system of the present invention is directed towards disinfecting "treated water." As used here, treated water refers to water from which most of the solids have been removed via bacterial digestion of digestible solids under aerobic conditions, e.g., water removed from the clarifier of a RATS.

Turning to FIG. 1, treated water enters conduit 10 from a RATS and flows in the direction of arrow A through conduit 10 towards a discharge outlet 12. Discharge outlet 12 can be connected to a pump tank where treated disinfected water is held to be pumped to a drip irrigation system, a spray field or simply discharged into a stream, i.e., by bypassing the pump tank. As the treated water passes through conduit 10, it impinges upon a float 14 which is connected via connector 16 to a float switch 18 which in turn is connected via electrical conductor 20 to control/alarm module 22. The water passing through conduit 10 also engages a weir 24 downstream of float 14. The purpose of weir 24 is to raise the level of the water flowing in conduit 10 sufficiently to cause float 14 to rise and close switch 18. The weir 24 as seen in FIG. 2 is simply a disk with a V slot 26. It will be understood that weir 24 can take many shapes, its sole purpose being to cause a temporary rise in the water level in conduit 10 upstream of weir 24 sufficient to cause float 14 to rise and close switch 18. It will be understood that the combination of float 14 and weir 24 act as a flow sensor, i.e., it senses when flow in conduit 10 increases from a normal first rate, e.g., no flow, to a second, predetermined higher rate.

Connected to conduit 10 and extending generally vertically up therefrom is a standpipe 28, connector 16 being disposed in standpipe 28. Also disposed in standpipe 28 is a feedline 30 which in turn is connected to a valve 32, valve 32 being downstream of the discharge of a pump 34 which via a line 36 can pump a liquid disinfectant 38 contained in a suitable vessel or reservoir 40 through valve 32 and line 30 into the water in conduit 10.

Disposed in disinfectant vessel 40 is a low level sensor 42 which is connected to a switch 44, switch 44 being connected via an electrical conductor 46 to control/alarm module 22.

In operation, and as is well known to those skilled in the art, there may be no or a small flow of treated water passing through conduit 10 past weir 24 and out discharge outlet 12. However, if due to usage of the RATS resulting from common residential activities, e.g., bathing, toilet usage, etc., there is a surge or increase of flow of treated water in conduit 10 which raises the level of treated water in conduit 10 upstream of weir 24, float 14 will rise and close switch 18. It will be understood that suitable electrical power is supplied to switch 18 control/alarm module 22, switch 44 and pump 34 in a manner well understood by those skilled in the art. One such wiring schematic is shown in FIG. 7, described below. In any event, the closure of switch 18 triggers control/alarm module 22 to activate pump 34 which in turn pumps liquid disinfectant 38 from disinfectant reservoir 40 through valve 32 and line 30 into the treated water in conduit 10. The pumping of disinfectant by pump 34 continues until the water level upstream of weir 24 in conduit 10 drops, i.e., until flow through conduit 10 returns to a "normal" rate, e.g., no flow. This of course results in the lowering of the level of water in conduit 10 upstream of weir 24 causing float 14 to now move downwardly and open switch 18 which via control/alarm module 22 shuts off power to pump 34 thereby discontinuing the injection of disinfectant 38 in the conduit 10.

To ensure that there is always disinfectant 38 in tank 40, there is a low level sensor 42 which, if the level 39 of disinfectant 38 in tank 40 drops to a certain predetermined level, will close low level switch 44 which in turn will send a signal to control/alarm module 22 and trigger an alarm which can be visual, audio, etc. to tell the user of the system that the level of disinfectant 38 in reservoir 40 needs to be replenished.

It will be understood that while the embodiment of FIG. 1 is described with reference to a float 14/weir 24 combination, any form of flow sensor could be employed. As described above, float 14 and weir 24 co-act to form a flow sensor. However, weir 24 and float 14 could be dismissed with in lieu of any number of flow rate sensors well known to those skilled in the art. When a weir is used, it can take the form of a rectangular weir, a triangular or v-notch weir as shown in FIG. 2 or a Cipollegiti weir. In addition to weirs, so called Parshall flumes can also be used as well, as mentioned, numerous other flow sensors.

While pump 34 can take many forms, an especially desirable pump is a diaphragm pump such as a miniature liquid diaphragm pump, SMF4 Series, Model 9141110 manufactured by Rietschle Thomas. Also, a peristaltic pump can be employed. These pumps are compact, highly reliable and inexpensive. Regardless of the type of pump, a preferred pump will have a flow rate of less than about 50 milliliters, especially 25 milliliters or less, per minute.

As noted above, there is a valve 32 downstream of pump 34. Although not absolutely necessary, it is desirable to incorporate a suitable valve to aid in controlling the amount of disinfectant injected into the treated water in conduit 10, i.e., in cases where pump 34 puts out a larger than needed dosage of disinfectant 38, the amount ultimately introduced into conduit 10 can be controlled via a suitable valve 32. It will be recognized that any type of valve which can act to throttle the flow into line 30 can be employed.

Low level sensor 42 shown in FIG. 1 can be any type of level sensor that can detect the level of a liquid in a vessel. For example a float/switch combination such as described above with respect to float 14 and switch 18 can be employed or any other numerous types of liquid level indicators/sensors could be used. For example, in addition the ball float mechanism there may also be used pilot-operated Cage-type gauges, chain or tape float gauges, magnetic float gauges, displacement-type liquid level elements such as torque-tube units and force-balance units, proximity sensor, light pipe sensors, etc.

Turning to FIG. 7, there is shown a typical wiring diagram which could be employed with the embodiment of FIG. 1. The wiring diagram shown in FIG. 7 comprises a ground line 200, a neutral line 202, and line pump 204, all of which are connected to control/alarm panel 22. Line 206 is the alarm line out from the low level sensor 42, 44 in reservoir 40 while line 208 is the alarm line in. Again, although not shown, lines 206 and 208 would be connected to control/alarm module 22.

Turning to FIG. 3, there is shown another embodiment of the disinfection system of the present invention. As noted above, in many cases a RATS contains a pump tank which holds treated water and also houses a discharge pump to pump the water from the pump tank to its end disposal. Turning then to FIG. 3 there is a pump tank 50 in which is housed a discharge pump 52, discharge pump 52 being connected to a discharge conduit 54 through which water 56 from pump tank 50 is discharged. There is a T-connection 58 which connects discharge pipe 54 to a return pipe 60 via a valve 62. Return pipe 60 serves to ensure, depending upon the setting of valve 62, whether a certain portion of the water being discharged to discharge pipe 54 is returned to pump tank 50 to ensure adequate mixing and residence time of the disinfectant in the treated water, the goal being that the water finally discharged through discharge pipe 54 is disinfected, treated water.

Disposed in pump tank 50 is a float 64 connected by a float arm 66. Although not shown, float arm 66 is connected to a switch which allows electrical power to be supplied to discharge pump 52 such that when float 64 reaches an upper, predetermined level, discharge pump 52 is turned on and disinfected, treated water is discharged through discharge pipe 54.

Treated wastewater from a RATS is introduced into pump tank 50 through line 70 where it enters a T-connection 72, the bottom portion of which is connected to a flow restrictor 74. Disposed in T-connection 72 is a float 76 connected to a float switch 78 which in turn is electrically connected via electrical conductor 80 to a control/alarm module 82. A disinfectant feed pipe 84 has an open end disposed internally of T-connection 72 and is connected via a valve 86 to a pump 88. Pump 88 in turn has an intake line 90, the open end of which extends into a disinfectant reservoir 92 containing a liquid disinfectant 94. A low level sensor 96, is connected to a switch 98 which in turn is electrically connected via electrical conductor 100 to control/alarm module 82.

In operation, wastewater entering pump tank 50 through line 70 will cause a temporary rise in the level of treated wastewater in conduit 70 and T-connection 72 depending on the setting of flow restrictor 74. Accordingly, in the case where float 76 and flow restrictor 74 are acting in conjunction as a flow rate sensor, float 76 will be caused to rise closing switch 78 and sending a signal to control/alarm panel 82 which in turn will send a signal via line 102 to pump 88 signaling pump 88 to turn on with the result that liquid disinfectant 94 will be injected into T-connection 72. Valve 86 serves the same purpose as described above with respect to valve 32 in the embodiment in FIG. 1. Additionally, as in the case of the embodiment shown in FIG. 1, low level sensor 96 is activated when the liquid disinfectant 94 in disinfectant tank 92 falls below a certain level, a condition which is indicated in FIG. 3. This will result in the closing of switch 98, if a float/switch combination is used, and the sending of a signal via conductor 100 triggering an alarm to indicate to the user that the level of disinfectant 94 in disinfectant tank 92 is low.

Pump tank 50 is provided with a selectively openable hatch 51 through which access can be had to perform maintenance, e.g., on the flow rate sensor, pump, etc.

As described above with respect to the embodiment of FIG. 1, any type of flow rate sensor can be employed in lieu of flow restrictor 74 and float 76, For example, so called head flow meters which operate by measurement of the pressure differential or head across a suitable restriction to flow can be employed. In addition, various flow meters such as rotameters, piston-type meters, rotating meters and the like can also be employed.

Figure 4:
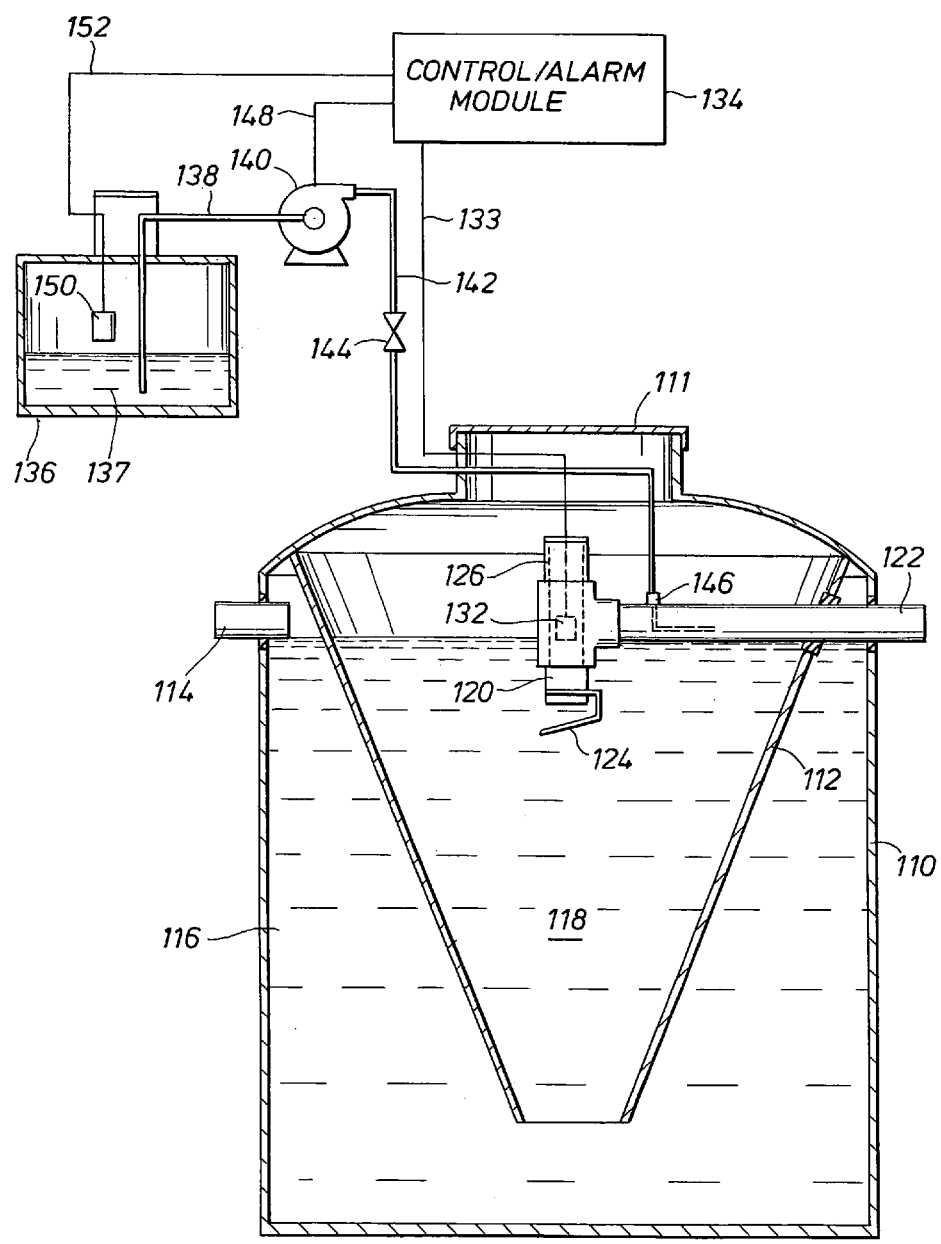
FIG. 4 is an elevational, schematic view of another embodiment of the present invention wherein the liquid disinfectant system is disposed in the clarifier portion of a typical aerobic wastewater treatment plant.

Turning now to FIG. 4, there is shown yet another embodiment of the present invention. FIG. 4 depicts an embodiment of the disinfecting system of the present invention wherein the disinfectant is added into the clarifier portion of the RATS. As noted above, a typical wastewater plant such as disclosed in U.S. Pat. No. 5,221,470, incorporated herein by reference for all purposes, is comprised of a cylindrical tank 110 in which is disposed an inverted frustroconical partition 112. Wastewater from a residence or the like is introduced into tank 110 through a conduit 114. Although not shown, it is common for tank 110 to have disposed therein an aerator to supply oxygen to the wastewater to promote the aerobic bacterial action that converts digestible solids in the wastewater to carbon dioxide and water. Thus, a typical RATS includes what can be referred to as a digestion or aerobic chamber 116 and a clarifier chamber 118. As the untreated wastewater that enters tank 110 through conduit 114 is aerobically digested in chamber 116, largely clarified, treated water rises in clarifier chamber 118, ultimately being discharged via a riser 120 which T's into a discharge pipe 122. The lower end of riser 120 is provided with a baffle 124 which minimizes solids rising upwardly in chamber 18 from entering riser 120. A hatch 111 is located at the upper end of tank 110 to provide access to the inside of the tank 110. Disposed in riser 120 is a surge control weir 126 which is described in detail in U.S. Pat. No. 5,770,081, incorporated herein by reference for all purposes.

Figure 5:
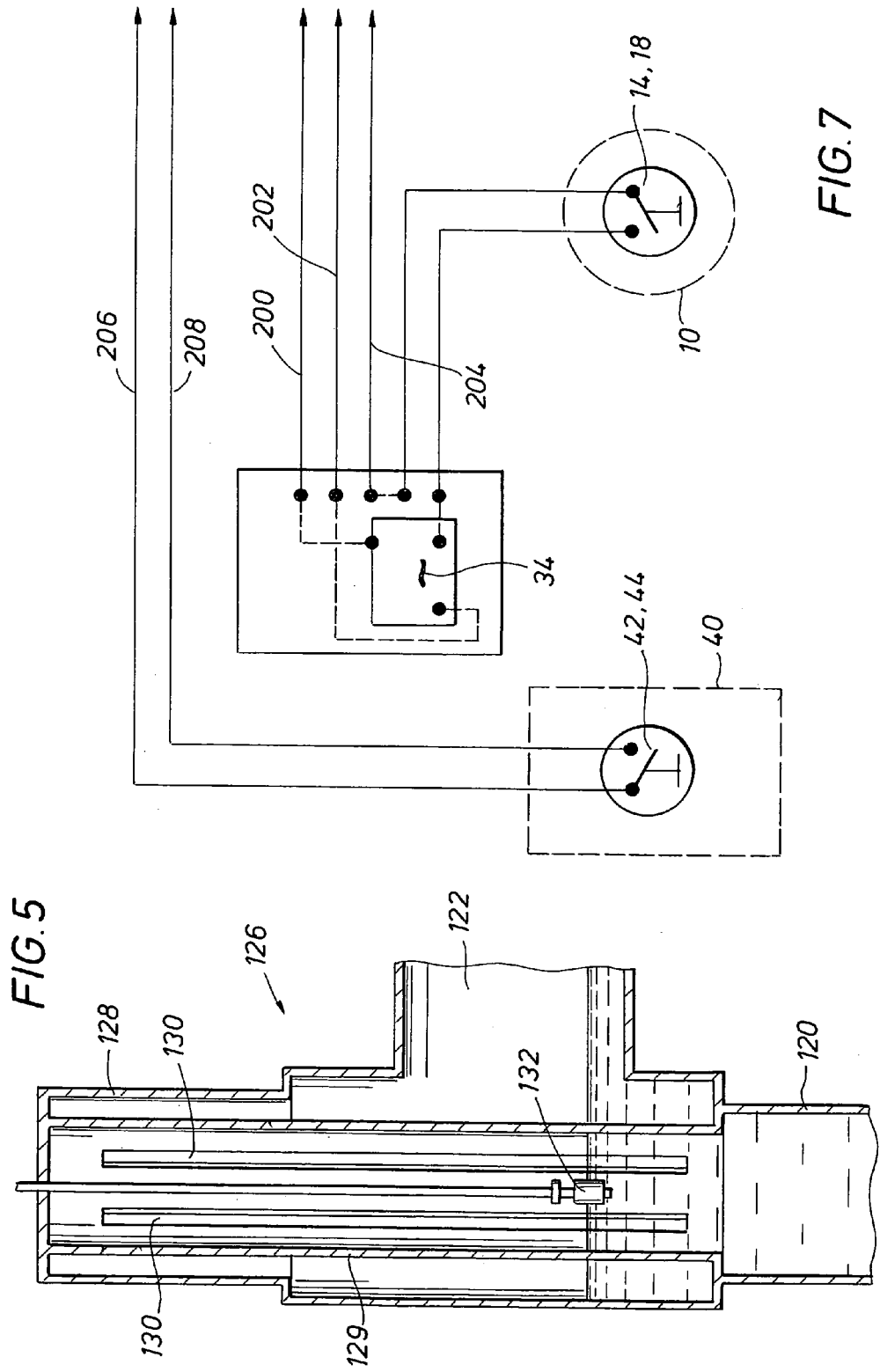
FIG. 5 is an enlarged view of the flow center assembly shown in FIG. 4.

As seen with reference to FIG. 5, weir 126 is comprised of a generally cylindrical, outer body 128 and a generally cylindrical inner, body 129 having a series of longitudinally extending slots 130. Although not shown, there is a seal which prevents treated water from chamber 118 from bypassing weir 126, i.e., treated water exiting chamber 118 through riser 120 enters the interior of body 129 of weir 126, the water exiting through slots 130 into discharge pipe 122. As can also be seen from FIG. 5, disposed internally of weir 126 is a float 132 which, while not shown, is connected to a float switch in the same manner described above with respect to the embodiment of FIGS. 1 and 3. Alternatively, rather than a float, any kind of flow rate sensor which is connected to a sensor switch, e.g., a float switch, or directly to a control/alarm module can be used. As seen in FIG. 4, float/sensor 132 is electrically connected via an electrical conductor 133 to control/alarm module 134.

There is a disinfectant reservoir 136 which contains a liquid disinfectant 137. Disposed in reservoir 136 is an intake line 138 which is connected to a pump 140 which in turn is connected to a feed line 142 which passes through a valve 144, the feed line terminating at 146 into outlet conduit 122. In operation, when the water in clarifier chamber 118 suddenly rises as would be caused by a surge of wastewater from residential usage into chamber 116 through conduit 114, float/sensor 132 would be activated, i.e., float 132 would be raised to close the float switch (not shown) which in turn would send a signal to control/alarm module 134. In response to this signal, a signal would be sent via line 148 to pump 140 to activate pump 140 to pump liquid disinfectant 137 into conduit 132. As described above with respect to the embodiments of FIGS. 1 and 3, valve 144 is of the throttling valve type to control the amount of liquid disinfectant introduced into the treated wastewater. As in the case of the embodiment shown in FIGS. 1 and 2, reservoir 136 has disposed therein a low level sensor 150 which in turn is connected to control alarm module 134 via an electrical connection 152. Accordingly, should the disinfectant level in reservoir 136 fall below a certain, desired level, low level sensor 150 will be activated sending a signal via connector 152 to control/alarm module 134 which in turn will activate an alarm to inform the user of the system that the liquid disinfectant in reservoir 136 is at a low level.

Once again it will be seen that the combination of weir assembly 126 and sensor 132 act as a flow rate sensor to indicate that a surge of water (increased flow) has entered clarifier chamber 118 and that hence there is a need for liquid disinfectant to be added such that the discharge from discharge pump 122 is disinfected, treated water.

Figure 6:
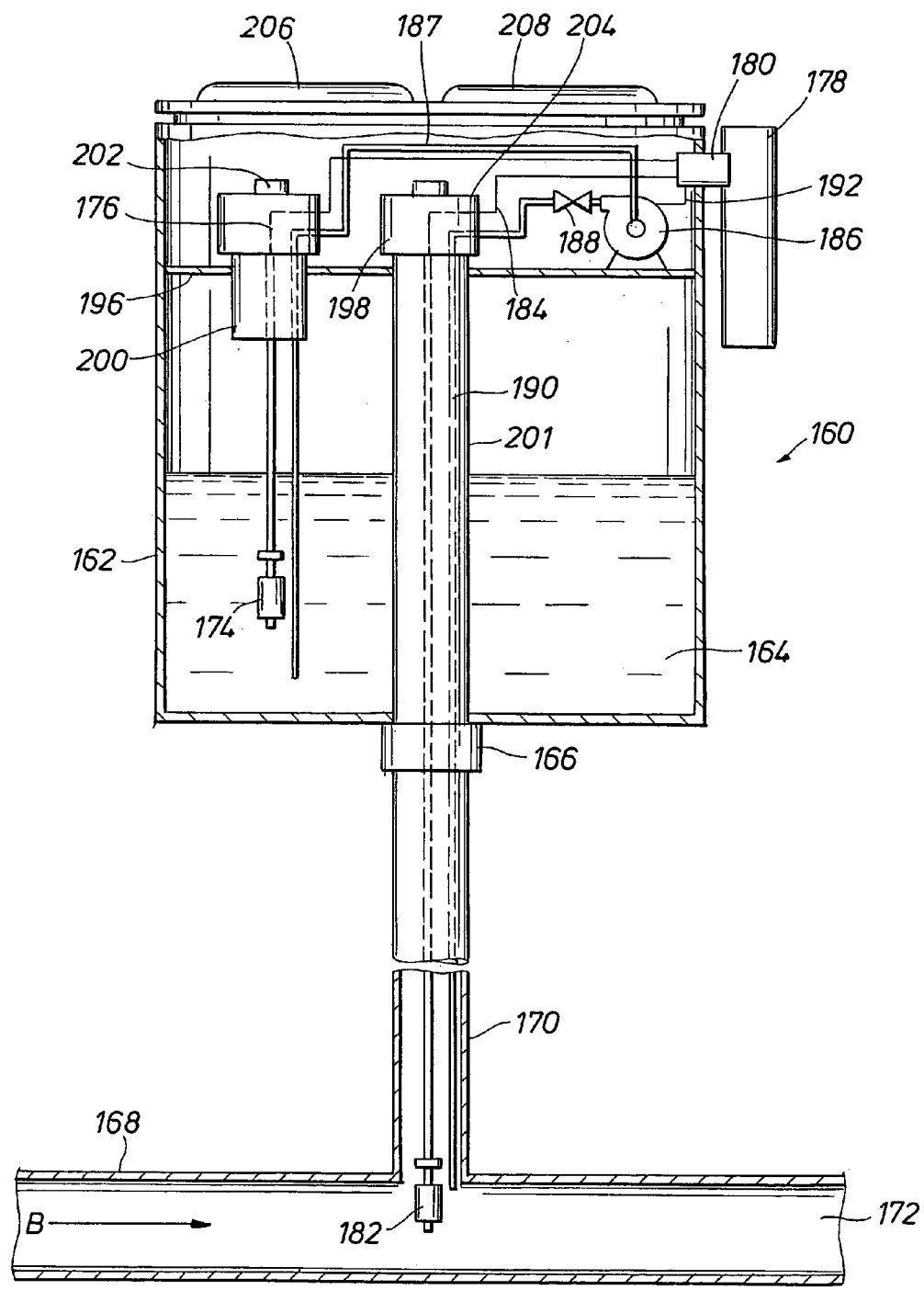
FIG. 6 is an elevational, schematic view of another embodiment of the present invention wherein the disinfection system of the present invention is in a self-contained unit which can be attached to a conduit passing treated wastewater from an aerobic wastewater treatment plant.

Referring now to FIG. 6, there is shown yet another embodiment of the present invention. Basically the embodiment of FIG. 6 differs from those previously described in that the disinfectant system is largely a self-contained module that can be conveniently attached to a transfer conduit through which treated wastewater from a RATS is passing, e.g., to a pump tank, discharge into a stream, etc.

Referring then to FIG. 6, the disinfection unit, shown generally as 160, comprises a vessel 162 in which is contained a liquid disinfectant 164. Disinfection unit 160 includes a grade adjustment 166 which allows unit 160 to be conveniently connected to a subsurface transfer conduit 168 by means of a riser 170. It will be understood that treated wastewater enters conduit 168 in the direction of arrow B and is discharged, e.g., either to a pump tank, stream or the like through outlet 172. Disposed in vessel 162 is a low level sensor 174 which is connected via an electrical connector 176 to a control/alarm module 178 through an interface 180. There is a flow sensor 182 disposed in conduit 168, sensor 182 being electrically connected via a line 184 to interface 180 and subsequently to control/alarm module 178. Also mounted in reservoir 162 is a pump 186 which is connected to an intake line 187 which extends into the liquid disinfectant 164. The outlet of pump 186 is in open communication with a throttling valve 187 which in turn is connected to conduit 190 which extends basically into conduit 168. Pump 186 is in electrical communication with control/alarm module 178 via an electrical connector 192.

It will be understood that FIG. 6 is a simplified schematic form of the invention and that there would be a suitable mounting platform 196 or the like which would hold pump 186, a riser 198 to which line 190 and the connector to sensor 182 run, as well as a riser 200 through which low level sensor 174 is suspended. As can also be seen, there are access plugs 202 and 204 to permit access to risers 200 and 201 for the purpose of servicing low level sensors 174 and flow sensor 182. Additionally, there are several hatches 206 and 208 in the reservoir 162 which permit the system component mounted on platform 196 to be serviced.

In operation, when flow sensor 182 detects increased flow in conduit 168, a signal is sent via electrical connector 184 to control/alarm module 178 which in turn triggers control/alarm module 178 to send a signal to pump 186 via connector 192 turning pump 186 on resulting in the injection of liquid disinfectant 164 into conduit 168.

So long as flow sensor 182 detects sufficient flow, pump 86 will remain activated, it being understood that in the case of the embodiment shown in FIG. 6 as well as the other embodiments, once flow of treated water has ceased or has returned to a predetermined flow rate, e.g., no flow, sensor 182 or the sensors described above with respect to the other embodiments will then signal the injection pump, via the control/alarm module, to cease operation thereby ceasing injecting of liquid disinfectant. It can thus be seen from the description above that a predetermined flow rate, i.e., a rate at which the flow sensors are not activated, can be no flow.

It will be appreciated that with respect to the embodiment shown in FIG. 6, a weir such as shown in FIG. 2 could also be employed. Alternatively, sensor 182 can be virtually any type of flow sensor as described above and as well know to those skilled in the art.

The term liquid disinfectant, as used herein, is intended to mean any chemical composition which is in the liquid form, e.g., a gas, solid or other liquid which can be dissolved in an aqueous medium and which is commonly used for disinfecting water. Non-limiting examples of such compositions include aqueous solutions of chlorine, bromine, iodine, solutions of sodium hypochlorite, solutions of other solid disinfectants which are soluble in water, etc. Alternatively, the liquid disinfectant can be a non-aqueous liquid, e.g., bromine.

Modifications of the apparatus, procedures and conditions disclosed herein that will still embody the concept of the improvements described should readily suggest themselves to those skilled in the art, and are intended to be encompassed within the spirit of the invention presently disclosed herein as well as the scope of the appended claims.

What is claimed is:

1. A system for introducing a liquid disinfectant into treated wastewater comprising:
   a source of liquid disinfectant;
   a sensor configured to detect flow of treated wastewater from a wastewater treatment system;
   a pump to introduce said liquid disinfectant into said treated wastewater; and
   a controller operatively connected to said sensor and configured to activate said pump in response to sensed, increased flow of said treated wastewater above a predetermined flow rate, wherein said sensor comprises a float and weir combination or a float and flow restrictor combination.

2. The system of claim 1 wherein said pump comprises a diaphragm pump.

3. The system of claim 1 wherein said sensor is disposed in a flow line from a residential aerobic treatment system.

4. The system of claim 3 further including a discharge line from said pump, said discharge line having an outlet into said flow line.

5. The system of claim 1 wherein there is a throttling valve disposed downstream of said said pump.

6. The system of claim 1 wherein said sensor is disposed in an inlet line internally of a pump tank.

7. The system of claim 1 wherein said sensor is disposed in the clarification chamber of a residential aerobic treatment system.

8. The system of claim 1 wherein said source of liquid disinfectant, said pump and said controller, are in a self-contained module.

9. The system of claim 1 wherein there is a reservoir for said disinfectant and a level detector to detect the level of said liquid disinfectant in said reservoir.

10. The system of claim 9 wherein said level detector is connected to an alarm to indicate when the level of liquid disinfectant in said reservoir falls below a predetermined level.

11. The system of any one of claims 3, 4, 5, 6, 7, 8, 9 or 10 wherein said pump comprises a diaphragm pump.

12. The system of any one of claims 3, 4, 5, 6, 7, 8, 9 or 10 wherein said pump has an output of less than about 25 milliliters per minute.

* * * * *